United States Patent [19]

Clarke et al.

[11] 4,318,675

[45] Mar. 9, 1982

[54] ROTARY EXPANSIBLE CHAMBER APPARATUS WITH STRESS RELIEF

[75] Inventors: John M. Clarke, Dunlap; Alan W. Wells, Edelstein, both of Ill.

[73] Assignee: Caterpillar Tractor Co., Peoria, Ill.

[21] Appl. No.: 120,431

[22] PCT Filed: Dec. 14, 1979

[86] PCT No.: PCT/US79/01128

§ 371 Date: Dec. 14, 1979

§ 102(e) Date: Dec. 14, 1979

[87] PCT Pub. No.: WO81/01723

PCT Pub. Date: Jun. 25, 1981

[51] Int. Cl.³ .................. F01C 1/00; F01C 21/08; F16B 35/04

[52] U.S. Cl. ..................... 418/53; 418/151; 403/260

[58] Field of Search ............ 418/53, 151, 49–52; 403/259, 260, 360, 373

[56] References Cited

U.S. PATENT DOCUMENTS

| | | | |
|---|---|---|---|
| 607,085 | 7/1898 | Roux | 418/53 |
| 1,840,711 | 1/1932 | Goodner | 418/53 |
| 2,602,683 | 7/1952 | Aue | 403/259 |
| 3,019,964 | 2/1962 | Griswold | 418/151 |
| 3,485,218 | 12/1969 | Clarke | 418/53 |
| 3,845,622 | 11/1974 | Hufstader | 403/258 |
| 3,966,366 | 6/1976 | Goloff | 418/53 |

FOREIGN PATENT DOCUMENTS 568213 12/1958 Canada ................ 403/259

*Primary Examiner*—John J. Vrablik
*Attorney, Agent, or Firm*—Anthony N. Woloch

[57] ABSTRACT

Rotary expansible chamber devices include slant-axis rotary apparatus such as engines, compressors, pumps, and the like. Eccentric rotating members of such apparatus generate thrust and bending loads of high magnitude during operation thereof. The rotor shaft of the apparatus is subjected to severe bending and thrust loads which tend to fatigue various connections in the apparatus. The present invention provides a connection for counteracting the bending loads, including a bolt (21) extending through a rotor shaft (15), a nut (28) threadably mounted (27) on an end of the rotor shaft, and portions (30,31) of the rotor shaft (15) and bolt (21) which are disposed closely adjacent to the nut (28) and are further disposed in press-fit relationship relative to each other. Thus, bending loads imposed on the rotor shaft are transmitted directly to the bolt but not to the screw threads during operation of the apparatus.

4 Claims, 1 Drawing Figure

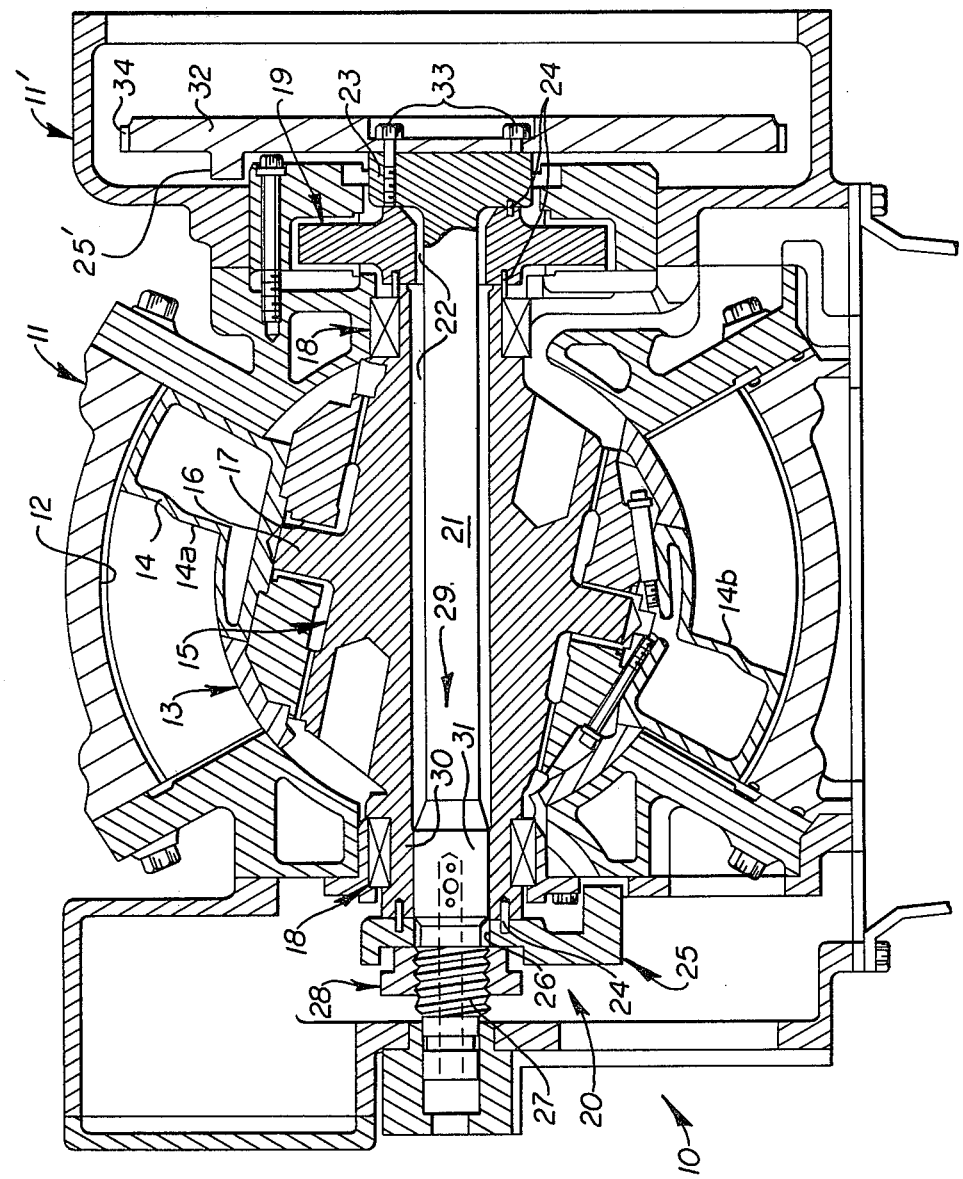

4,318,675

ROTARY EXPANSIBLE CHAMBER APPARATUS WITH STRESS RELIEF

TECHNICAL FIELD

This invention relates generally to rotary expansible chamber devices and more particularly to those having a nutating working member and axially spaced working chambers.

BACKGROUND ART

Rotary expansible chamber devices brought about slant-axis rotary (SAR) apparatus for use in compressors, engines, pumps, and the like. Such devices present related stress problems.

In such devices, a bearing mounted rotor and shaft are angularly offset relative to their axis of rotation. As a result, substantial bending stress loads are imposed on associated components of the SAR device. There is a working chamber surrounding the rotor, and gas loads in the chamber apply alternating forces on a flange of the rotor. Thus, substantial thrust loads are also imposed on associated components of the SAR device. One approach to counteracting such loads has been to use rolling element bearings. However, these bearings have been found to be too bulky when the required size of bearings was employed to counteract the large magnitude of thrust loads involved. As an alternative, a threaded connection was used to secure a thrust collar to the rotor shaft to counteract such thrust loads. However, the threaded connection was subjected to high bending loads resulting in metal fatigue and potential breakage.

The foregoing illustrates limitations of the known prior art. Thus, it is apparent that it would be advantageous to provide an alternative directed to overcoming one or more of the limitations as set forth above.

DISCLOSURE OF INVENTION

In one aspect of the present invention, this is accomplished by providing a rotary apparatus including a shaft and a rotor mounted for eccentric rotation in a housing. The rotation imposes bending loads on the shaft. A bolt extends axially through the shaft and a nut is connected to the bolt by screw threads. Means are provided for transmitting the bending loads from the shaft to the bolt and for protecting the screw threads from the bending loads.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the drawing:

The FIGURE is a cross-sectional view illustrating an embodiment of this invention.

BEST MODE FOR CARRYING OUT THE INVENTION

The drawing illustrates a slant-axis rotary apparatus 10, such as a compressor, engine, pump, or the like. The apparatus comprises a housing 11, defining an annular chamber 12 therein, and a rotor 13 having a radial first flange 14 disposed in the chamber. A rotor shaft 15 is eccentrically formed in a conventional manner and has an eccentric second flange 16 disposed in an accommodating slot 17 defined in rotor 13 to provide a desired nutating or wobble action, as is well known in the art. Rotor shaft 15 is suitably journaled on housing 11 by a pair of laterally spaced, standard bearing assemblies 18. The nutating action imposes high stress loads on the shaft 15.

It is further well known that apparatus of this type generates loads and stresses of high magnitude due to gas in chamber 12 causing thrust loads applied alternately to one side 14a of flange 14 and then to another side 14b of flange 14. In order to counteract thrust loads imposed on rotor shaft 15, an annular thrust collar 19 is secured to the shaft in a manner described in detail hereinafter. Such loads further include periodic bending loads imposed on rotor shaft 15 due to forces resulting from the gas in chamber 12. Also, such bending loads in a conventional apparatus of this type tended to fatigue and occasionally break a threaded connection of the rotor shaft, when a nut was employed to secure thrust collar 19 thereon.

This invention overcomes the above briefly described well-known problems in the art by providing a structurally integrated and stress-relieved connection 20 for securing rotor shaft 15 in place and for further securing attendant components thereto, such as thrust collar 19. Connection 20 includes an elongated bolt 21 extending axially through rotor shaft 15 and thrust collar 19. It should be noted that annular clearances 22 are provided between a substantial length of rotor shaft 15 and bolt 21, as well as between thrust collar 19 and the bolt, for purposes hereinafter more fully explained.

A first end of bolt 21 has a flange 23 formed thereon with thrust collar 19 being clamped axially between the flange and rotor shaft 15. One or more circumferentially disposed locating pins or dowels 24 may be interconnected between an end of rotor shaft 15, flange 23, and thrust collar 19 to properly position these components relative to each other. A counterweight 25 is mounted on a second end of bolt 21 and is also precisely positioned relative to rotor shaft 15 by locating pins 24. It should be noted that an annular clearance 26 is preferably provided between counterweight 25 and bolt 21.

Screw threads 27 are formed on the second end of bolt 21 to threadably receive a nut 28 thereon. The nut functions to clamp rotor shaft 15, thrust collar 19, and counterweight 25 together, whereby they will rotate as a unit.

As suggested above, during operation of apparatus 10, rotor shaft 15 is subjected to bending loads of substantial magnitude. In order to counteract and absorb substantial portions of these bending loads, a means 29 is provided for transmitting such loads to bolt 21 directly and for preventing the imposition of bending stresses on screw threads 27. Means 29 ensures that the leftward ends of rotor shaft 15 and bolt 21, as well as counterweight 25 and nut 28, will move together without any relative cocking motion when subjected to bending loads to prevent the introduction of any cyclic bending stresses at the roots of threads 27 within nut 28, where the stresses are already high, to thus prevent fatigue failure thereat.

In the embodiment illustrated, means 29 includes a collar portion 30 of rotor shaft 15 which is press-fitted or otherwise suitably secured on an enlarged cylindrical portion 31 of bolt 21. Such interference fit will thus ensure the above-described unitized construction, preventing any relative cocking motion between threads 27 and nut 28 to maintain the threads relatively free of the previously known bending stresses. Thus, means 29 functions for transmitting bending loads from shaft 15 to bolt 21 via portions 30,31, respectively, and simultaneously protects or isolates screw threads 27 from the bending loads.

It should be noted in the drawing that the turning down of nut 28 will place bolt 21 under tension, whereas rotor shaft 15, thrust collar 19, and counterweight 25 are maintained in axial compression.

Another feature of the invention described herein is the ability of bolt 21 to further function as a drive component of the apparatus. For example, a flywheel 32 may be suitably secured to flange 23 of bolt 21 by a plurality of bolts 33 with gear teeth 34 being formed on the periphery of the flywheel to provide a source for a powered start. Alternatively, flywheel 32 could be clamped between thrust collar 19 and flange 23 with slight modification being required for a portion 11' of housing 11 adjacent flywheel 32. Other power transmitting devices such as clutches and transmissions could be suitably connected to bolt 21, as will be appreciated by those skilled in the art relating hereto.

It should be noted in the embodiment illustrated in the drawing, a second counterweight 25' is usually secured on flywheel 32 to balance-out the wobble forces created by operation of rotor 13 and shaft 15. Furthermore, it should be understood that counterweight 25, for example, need not be clamped between rotor shaft 15 and nut 28, but should be secured on rotor shaft 15 in any other well-known manner and at a location suitable for effecting a balanced apparatus. Furthermore, flange 23 could be eliminated with bolt 21 being extended through flywheel 32 and with another nut being threaded onto this end of the bolt to clamp the flywheel against thrust collar 19.

INDUSTRIAL APPLICABILITY

With the parts assembled as set forth above, slant-axis rotary apparatus 10 may find application as an engine, pump, compressor, and the like.

In operation, and applying apparatus 10 as an engine, gas forces on flange 14 will effect rotation of shaft 15 and, thus, bolt 21 in the well-known manner. The main power takeoff from the engine may comprise flywheel 32. However, and as suggested above, other means may be secured to bolt 21 to provide a main power takeoff as well as one or more accessory takeoffs. During operation of the engine, thrust loads imposed on rotor shaft 15 would be counteracted by thrust collar 19, whereas bending loads imposed thereon would be transmitted to bolt 21 directly by means 29.

As shown in the drawing, clearances 22 and 26 ensure that the axial clamping load resulting from tightening the nut 28 is largely transferred to the thrust collar 19 while the press-fit connection between portions 30 and 31 of rotor shaft 15 and bolt 21, respectively, will absorb bending loads imposed on the rotor shaft to maintain screw threads 27 and the threads of nut 28 relatively free of those bending loads. The use of a single nut 28 for clamping the rotor assembly in place further expedites assembly of apparatus 10, as well as disassembly thereof for servicing purposes.

The foregoing has described a rotary expansible chamber apparatus with stress relief.

It is anticipated that aspects of the present invention, other than those specifically defined in the appended claims, can be obtained from the foregoing description and the drawings.

We claim:

1. In a rotary apparatus (10) having a shaft (15) and a rotor (13) mounted for eccentric rotation in a housing (11), said rotation imposing bending loads on said shaft (15), the improvement comprising:
    a bolt (21) extending axially through said shaft (15);
    a nut (28) connected to said bolt (21) by screw threads (27);
    means (29) for transmitting said bending loads to said bolt (21) and for protecting said screw threads (27) from said bending loads, said means (29) including a portion (30) of said shaft (15) engaged with a portion (31) of said bolt (21);
    means for counteracting axial loads imposed on said shaft (15) by said rotor (13), said means being a thrust collar (19);
    said bolt (21) has an annular flange (23) on an end thereof and wherein said thrust collar (19) is clamped axially between said flange (23) and said shaft (15); and
    means (22) for defining an annular clearance between said bolt (21) and said thrust collar (19) and between said bolt (21) and a substantial axial length of said shaft (15).

2. The apparatus of claim 1 further including a counterweight (25) secured between said nut (28) and said shaft (15) and means (26) for defining an annular clearance between said counterweight (25) and said bolt (21).

3. A rotary apparatus (10) comprising:
    a housing (11) defining an annular chamber (12) therein;
    a rotor (13) mounted in said housing (11) and having a first flange (14) disposed in said chamber (12);
    a shaft (15) having a second flange (16) thereon engaging said rotor (13), said rotor (13) and shaft (15) mounted for eccentric rotation in said housing (11), said rotation imposing bending loads on said shaft (15);
    a bolt (21) extending through said shaft (15) and having an annular flange (23) on a first end thereof and screw threads (27) formed on a second end thereof;
    a thrust collar (19) disposed axially between said shaft (15) and said flange (23);
    a nut (28) mounted on the screw threads (27) of said bolt (21);
    means (29) for transmitting said bending loads to said bolt (21) and for protecting said screw threads (27) from said bending loads, said means (29) including a portion (30) of said shaft (15) engaged with a portion (31) of said bolt (21); and
    means (22) for defining an annular clearance between said bolt (21) and said thrust collar (19) and between said bolt (21) and a substantial axial length of said shaft (15).

4. The apparatus of claim 3 further including a counterweight (25) secured between said nut (28) and said shaft (15) and means (26) for defining an annular clearance between said counterweight (25) and said bolt (21).

* * * * *